3,756,949
SHAPED PARTICLES
Raymond L. Schreurs, St. Paul, Minn., assignor to Universal Oil Products Company, Des Plaines, Ill.
No Drawing. Continuation-in-part of application Ser. No. 859,210, Sept. 18, 1969. This application Aug. 30, 1971, Ser. No. 176,299
Int. Cl. E21b 37/00
U.S. Cl. 252—8.55 B    11 Claims

ABSTRACT OF THE DISCLOSURE

Shaped particle of a solid composite of sulfamic acid, alkali metal chloride, polyoxyalkylene ether wetting agent, sodium diphenylamino-azo-m-benzene sulfonate and magnesium oxide. The composite preferably also contains a polyalkylene glycol lubricant. In another embodiment the composite also contains an acid corrosion inhibitor. In still another embodiment the composite also contains a barium compound. The composite is used to remove incrustations which plug well streams.

CROSS REFERENCE TO RELATED APPLICATION

This is a continuation-in-part of copending application Ser. No. 859,210, filed Sept. 18, 1969 and now abandoned.

BACKGROUND OF THE INVENTION

Either during the installation of screens in water wells or after use, the well screens become incrusted and results in plugging of the well. It is believed that the incrustations result from one or more causes. These include chemical precipitation resulting in the formation of calcium carbonate, magnesium carbonate, etc., or iron oxide, manganese oxide, etc. Another cause is referred to as iron bacteria. Still another cause may be the clay used as drilling mud or naturally occurring clay. Various methods are being used to remove the incrustations and to open the well for satisfactory use. In one method, various acids are pumped into the well to dissolve and remove the incrustants. A more recent development is the use of sulfamic acid, either as a solution or as granules, and it also has been proposed to use a wetting agent to improve the cleaning action.

DESCRIPTION OF THE INVENTION

While the above methods are more or less satisfactory, there are some disadvantages inherent therein. When using a liquid acid, the disadvantages include the great care required in handling the acid to avoid spillage and resultant personal contact, special containers and pumps are required for transporting and using the acid, and the shipping costs are high. Accordingly it would be preferred to use an acid in solid form. For this reason, sulfamic acid, which is normally a solid, offers advantages in handling and in introducing the granules into the well. The granules readily dissolve in water, either introduced into the well or already present in the well, and becomes a strong acid to dissolve the incrustants.

While sulfamic acid is preferred for this use, even further improvements are desired. As hereinbefore set forth, a particular type of wetting agent is desirable in order to aid the penetration into the plugging material and to assist in spreading the acid coverage over a wider area of the incrustant. The wetting agent should be a low foaming non-ionic agent. A particularly desirable wetting agent is a polyoxyalkylene ether having hydrophilic groups at both ends of its hydrophobic base.

As a further improvement, it is of advantage to use an alkali metal chloride as a pH activator to energize the dry acid and to speed the reaction of the acid with the chemicals that form the incrustations. Also, it is desirable to include a pH indicator in order to readily determine when the reactivity of the acid has been expended. Still another advantage includes the use of an acid corrosion inhibitor in order to minimize reaction with the metal surfaces of the well screen or other metal equipment contacted by the acid.

It would be of great advantage if all of these constituents could be formed into a single dry composite, which could be safely handled as dry shaped particles and could readily be dumped into the well. In addition, it would be of great advantage that the composite be of sufficient density so that it would sink to the bottom of the well and therein dissolve in water, either present in the well or subsequently introduced, and react with the incrustants plugging the well. In other words, the reactivity of the material would not be wasted by prematurely reacting during descent to the bottom of the well and instead would react only at the point where needed. To accomplish this, it is desirable to also include a hardener. In forming the composite into shaped particles, such as pellets, tablets, discs, etc., in some cases it also may be desirable to include a lubricant to serve in the forming operation.

The desirable objectives set forth above meet with numerous difficulties. The different chemical constituents of the composite must be compatible with each other and must not react adversely. Furthermore, it is necessary that the individual components retain their individual function even though admixed in the composite. Still further, it is necessary that the composite is readily soluble and that the resultant solution functions to remove the incrustants. In addition to these important requirements, it is desirable that the mixture be formed as shaped particles, which are dry and can be safely handled and which will be of sufficient density to drop to the bottom of the well where the composite performs as required.

In preparing shaped solid particles having the properties as mentioned above, various mixtures were considered and evaluated. As a result of this investigation, a novel composite was prepared and found to be very satisfactory for dissolving and dispersing incrustations that plug the well screens.

The shaped solid particles of the present invention comprise a composite of about 70% to about 80% by weight of sulfamic acid, about 15% to about 25% by weight of an alkali metal chloride, about 1% to about 3% by weight of a polyoxyalkylene ether wetting agent, about 0.01% to about 0.5% by weight of sodium diphenylamino-azo-m-benzene sulfonate indicator, and about 0.5% to about 10% by weight of magnesium oxide. In another embodiment the composite also contains about 1% to about 3% by weight of a polyalkylene glycol lubricant. The preferred mixture also contains from 0.5% to about 2% by weight of an acid corrosion inhibitor.

The above composite dissolves in about 2 hours and is suitable for use in wells of average depth. However, for deeper wells, say of the order of 3000 feet, it is desired that the composite does not dissolve in less than 8 hours and preferably of the order of 9 to 14 hours or perhaps more. Also, it is desired that the composite be of higher density so that it will drop the longer distance to the bottom of the deeper well. In this embodiment the composite preferably also contains a weighting agent which preferably is barium sulfate. The barium sulfate will be used in a concentration of about 10% to about 20% by weight of the composite. Also, in this embodiment, the concentration of magnesium oxide will be at the higher level in the range hereinbefore set forth and thus will be within a concentration of about 2% to about 10% by weight of the composite. In still another embodiment, the magnesium oxide may be used in a concentration of up to 25% or 30% to serve as a weighting agent and the barium compound omitted or used in a lower concentration of 0.5% to 10% by weight.

In either embodiment of the invention as hereinbefore set forth, it is understood that the specific concentrations will be proportioned so that the final composite will total 100% by weight. In general, the components used in the smaller concentrations should not be increased too much because these components are the more expensive materials and should be used in as low a concentration as practical for the desired purpose, thus reducing the cost of the final composite.

As hereinbefore set forth the major component of the composite is sulfamic acid. Sulfamic acid is available commercially in granular form. The composite of the present invention should contain a minimum of about 70% by weight of sulfamic acid and may range up to about 80% by weight thereof.

The composite contains an alkali metal chloride as a pH activator. Sodium chloride is particularly preferred because of its low cost. Other alkali metal chlorides include potassium chloride, lithium chloride, rubidium chloride and cesium chloride. Sodium chloride is very satisfactory for the purpose and accordingly is preferred for economic reasons. The alkali metal chloride is used in a concentration of about 15% to about 25% by weight of the composite. As mentioned above, the sodium chloride functions as a pH activator and energizes the dry acid in order to speed the reaction with the chemicals that plug the screen.

The wetting agent improves the cleaning action by facilitating penetration into the plugging material over a wider area of the incrustants. Any suitable polyoxyalkylene ether is used and should contain hydrophilic groups at both ends of its hydrophobic base. A preferred polyoxyalkylene ether is a mixed polyoxyethylene polyoxypropylene and is prepared by first condensing propylene oxide with propylene glycol and then condensing with ethylene oxide. Other polyoxyalkylene ethers comprise polyoxyethylene ether, polyoxypropylene ether, etc. A particularly preferred polyol is available commercially under the trade name of "Pluronic F68 LF" and is said to have an average molecular weight of 7700, a melting point of 47° C. minimum and a low cloud point of 32° C. in 1% aqueous solution. This material is available commercially in flake form and thus is readily incorporated into the composite. Other suitable wetting agents may have a molecular range of from about 5000 to about 10,000 or more. A number of these polyoxyalkylene ethers having hydrophilic groups at each ends of the hydrophobic base are available commercially. These generally are available in flake form although, in some cases, the wetting agent may be available in paste form.

The composite also contains about 0.1% to about 0.5% by weight of sodium diphenylamino-azo-m-benzene sulfonate a pH indicator. This material is available commercially as metanil yellow. The composite containing this indicator produces a purple or dark red solution when first mixed with water. As it dissolves the incrustants, the solution turns light red or orange and finally to yellow. The yellow color indicates that the solution is weak and now is ready for removal, at which time the solution is either pumped or bailed out of the well for disposal in a safe place, such as in a sewer or dump. This offers a definite advantage to the personnel in indicating when the potency of the solution is expended and when the solution is ready to be removed from the well.

In order that the composite is of sufficient physical hardness to serve satisfactorily as shaped particles, about 0.5% to about 10% by weight of magnesium oxide is included in the composite. For shallow or average size wells, the magnesium oxide will be used in a concentration of about 0.5% to about 2% by weight. However, when employed along with barium sulfate for use in deeper wells, the magnesium oxide may be used in a higher concentration, which may be from about 2% to about 10% by weight of the composite, in which case the magnesium oxide serves the dual function of a hardener and partial contribution as a weighting agent. As hereinbefore set forth, the magnesium oxide may be used in a concentration of up to 30% and the barium compound omitted or used in lower concentration.

The composite is formed into any desirable shape such as pellets, pills, discs, tablets, etc., while in some cases the forming is accomplished without the use of an extraneous lubricant, in other cases it is desirable to use a lubricant for the forming operation. Any suitable lubricant may be used. A particularly satisfactory lubricant is polyethylene glycol and is used in a concentration of about 1% to about 3% by weight of the composite. A number of polyethylene glycols are available commercially under the tradename of "Carbowax." A particularly preferred polyethylene glycol is Carbowax polyethylene glycol 4000 PG, which is said to have a molecular weight range of 3000–3700, a specific gravity at 20/20° C. of 1.204 and a freezing range of 53–56° C. Other polyethylene glycols may have a molecular weight of from 1000 to 20,000. Another lubricant is polypropylene glycol which may have a molecular range of from about 1000 to 20,000. Still other wetting agents may comprise methoxypolyethylene glycols which may have a molecular range from about 1000 to 5000 or more.

In order to protect metal surfaces and save wear and tear on the screens, casings, pumps, etc., it is desirable to also include an acid corrosion inhibitor in the composite. The acid corrosion inhibitor generally will be used in a concentration of about 0.5% to about 2% by weight of the composite. A particularly suitable acid corrosion inhibitor is available commercially under the trade name of Rodine 130 and is the reaction product of cyclic bases from coal tar with an organic chloride and with water soluble thiocyanate or thiourea. The cyclic bases from coal tar comprise pyridine, lutidines, picolines, collidines, quinoline, substituted derivatives thereof or mixtures thereof. The organic chloride is selected from ethylene dichloride, propylene dichloride, dichloroethyl ether, dichloroisopropyl ether, triglycol dichloride, tetraglycol dichloride, benzyl chloride and naphthyl methyl chloride. The water soluble thiocyanate and thiourea are the ammonia, sodium or potassium derivatives thereof. The reaction of the cyclic base and the organic chloride is effected at a temperature of about 350° F. This acid corrosion inhibitor is colorless and accordingly will not obscure the color change of the pH indicator. It is available commercially as a powder and thus is readily incorporated into the composite of the present invention.

As hereinbefore set forth the above mixture, when formed into shaped solid particles, is advantageously used in shallow or average wells. However in deeper wells, the composite in another embodiment preferably also contains a barium compound and particularly barium sulfate as a weighting agent. Other barium compounds include barium oxide, barium hydroxide, etc. The barium sulfate is used in a concentration of about 10% to about 20% and perhaps, in some cases, up to 25% by weight of the composite. This produces a pellet of higher density which will sink to the bottom of deep wells wherein it serves to remove incrustations from the screen. The composite also will not prematurely dissolve to any substantial extent and thus will not decompose substantially during its descent down the well and become wasted before it can serve the desired function.

The shaped particles are prepared in any suitable manner. In one method the solids are ground where necessary into powders and the powders are intimately mixed and formed into particles of uniform size and shape in any suitable manner, including conventional pelleting, pilling or other suitable methods. A preferred shaped particle is a disc of a diameter of less than 1" and a depth of less than 1". Similarly, pellets, pills or other shapes should be of less than 1" in diameter or length. For practical use, the shaped particles should be of a size of from ⅛" to 1" and preferably of a size of from ⅛" to ¾" in each dimension. A preferred disc, for example, will be from ⅝" to ¾" in diameter and from ⅜" to ⅝" deep. These particles are dry and can safely be handled and transported in the absence of moisture. The pellets then are dumped into a plugged well and will drop to the bottom of the well, to dissolve in water and to form an acid solution which will dissolve and disperse incrustations blocking the well screen. Generally it is preferred to impart some mechanical agitation to loosen the incrustations after dumping the composite into the well. One method of accomplishing this is the start and stop action of the pump.

The shaped particles of the present invention will be used in sufficient amount to accomplish the desired opening of the well. One gallon of the solid particles is sufficient to treat two 2" wells or five 1¼" wells when the screens are 5' or shorter and the wells are only moderately plugged. A larger quantity is required when the screen is badly plugged. Two gallons of the composite should be used for a 4' well and 5 gallons for a 6' well. In general, a larger amount of the solid particles is required when the water is at lower temperature. In most cases one treatment will be sufficient to remove the incrustations. However, in the more badly plugged screens, two or more treatments will be necessary. The solution should be allowed to stand in the well for several hours and in stubborn cases it may be necessary to leave the solution in the well overnight.

As hereinbefore set forth the color of the solution will change from a purple or dark red to light red or orange and finally to yellow. At this stage the solution has served its purpose and the solution should be bailed or pumped out of the well and disposed of in a safe place, such as a sewer or dump. It should not be hooked up to a distribution system until all of the acid is gone.

The following examples are introduced to illustrate further the novelty and utility of the present invention but not with the intention of unduly limiting the same.

EXAMPLE I

Solid discs of 11/16" diameter and ½" deep were prepared to comprise 75% by weight sulfamic acid, 19% by weight of sodium chloride, 2% by weight of Pluronic F68–LF wetting agent, 1% by weight of Rodine 130 acid corrosion inhibitor, 2% by weight of Carbowax polyethylene glycol 4000 lubricant, 1% by weight of magnesium oxide and about 0.05% by weight of sodium diphenylamino-azo-m-benzene sulfonate were ground, intimately mixed and formed into discs in conventional pelleting equipment. The discs are yellow in color and dry to the touch. One-half gallon container of the discs prepared in the above manner is used to treat a 2" well having a 4' screen which is plugged by incrustations. The discs are dumped into the well and allowed to remain for 4 hours, after which time the solution turns yellow. The solution then is pumped out of the well and sent to a sewer. The well now is deplugged and is ready for normal use.

EXAMPLE II

Similarly shaped discs are prepared to comprise the mixture described in Example I except that the mixture also contains barium sulfate in an amount of 1 pound of barium sulfate per 8 pounds of the above mixture, as well as about ⅓ of a pound of magnesium oxide, additional to the 1% originally present, per 8 pounds of the above mixture. As hereinbefore set forth this mixture has a higher density, dissolves at a lower rate and is of advantage for use in deep wells.

I claim as my invention:

1. Shaped solid particles of a composite of about 70% to about 80% by weight of sulfamic acid, about 15% to about 25% by weight of alkali metal chloride, about 1% to about 3% by weight of polyoxyalkylene ether wetting agent which is a mixed polyoxyethylene polyoxypropylene ether having hydrophilic groups at both ends of its hydrophobic base, about 0.01% to about 5% by weight of sodium diphenylamino-azo-m-benzene sulfonate and about 0.5% to about 10% by weight of magnesium oxide.

2. The composite of claim 1 also containing about 0.5% to about 2% by weight of an acid corrosion inhibitor.

3. The composite of claim 1 additionally containing, in proportion, about 5 to about 20 pounds of a barium compound selected of the group consisting of barium sulfate, barium oxide and barium hydroxide per 100 pounds of the mixture recited in claim 1.

4. The composite of claim 3 in which said barium compound is barium sulfate.

5. The composite of claim 1 in which said alkali metal chloride is sodium chloride.

6. The composite of claim 1 in which said wetting agent is mixed polyoxyethylene polyoxypropylene ether having a molecular weight of from about 5000 to about 10,000.

7. The composite of claim 6 in which said wetting agent is the condensation product of propylene oxide with propylene glycol further condensed with ethylene oxide.

8. The composite of claim 1 additionally containing about 1% to about 3% by weight of a water soluble polyalkylene glycol lubricant selected from the group consisting of polyethylene glycols, polypropylene glycols and methoxypolyethylene glycols as a particle-forming aid.

9. The composite of claim 8 wherein said lubricant is polyethylene glycol of a molecular weight of from about 1000 to about 20,000.

10. The composite of claim 1 being in the form of discs having a diameter of from ⅛" to 1" and being from ⅛" to 1" deep.

11. The method of removing incrustations from a well screen disposed in a water well which comprises introducing into said well the composite of claim 1.

References Cited
UNITED STATES PATENTS

| | | | |
|---|---|---|---|
| 2,148,006 | 2/1939 | Averson | 252—8.55 |
| 2,225,294 | 12/1940 | Bolton et al. | 252—8.55 |
| 2,978,026 | 4/1961 | Bemis | 252—8.55 |
| 3,042,610 | 7/1962 | Dunlap | 252—8.55 |
| 3,470,959 | 10/1969 | Kruez et al. | 252—8.55 |

HERBERT B. GUYNN, Primary Examiner

U.S. Cl. X.R.

166—311; 252—8.55 C